United States Patent [19]

Nysen

[11] Patent Number: 4,623,890

[45] Date of Patent: Nov. 18, 1986

[54] APPARATUS FOR COMPENSATING NON-LINEARITIES IN FREQUENCY-MODULATED SIGNAL

[75] Inventor: Paul A. Nysen, Sunnyvale, Calif.

[73] Assignee: X-Cyte Inc., Mountain View, Calif.

[21] Appl. No.: 509,522

[22] Filed: Jun. 30, 1983

[51] Int. Cl.[4] .......................... G01S 13/82; G01S 9/42
[52] U.S. Cl. .................................... 342/44; 342/54
[58] Field of Search ............ 343/6.5 R, 6.5 SS, 6.8 R,
343/14; 328/162, 140, 141; 307/522, 523, 529;
331/178; 332/18

[56] References Cited

U.S. PATENT DOCUMENTS

| | | | |
|---|---|---|---|
| 2,817,012 | 12/1957 | Kendall | 343/6.5 SS |
| 3,209,350 | 9/1965 | Davis et al. | 343/6.5 SS |
| 3,363,246 | 1/1968 | Gareis et al. | 343/6.5 SS |
| 3,521,280 | 7/1970 | Janco et al. | 343/6.5 SS |
| 3,631,484 | 12/1971 | Augenblick | 343/6.5 R |
| 3,679,983 | 7/1972 | Theriot | 343/17.2 PL X |
| 3,737,911 | 6/1973 | Sakuragi et al. | 343/6.5 SS |
| 3,878,528 | 4/1975 | Majeau | 343/6.5 SS |
| 4,023,167 | 5/1977 | Wahlstrom | 343/6.5 SS |
| 4,044,355 | 8/1977 | Edvardsson | 343/14 |
| 4,059,831 | 11/1977 | Epstein | 343/6.8 R |
| 4,069,472 | 1/1978 | Kamata et al. | 343/6.5 SS X |
| 4,106,020 | 8/1978 | Johnson | 343/14 |
| 4,151,525 | 4/1979 | Strauch et al. | 343/6.5 R |
| 4,263,595 | 4/1981 | Vogel | 343/6.5 SS |
| 4,388,524 | 6/1983 | Walfon | 343/6.5 R X |

Primary Examiner—T. H. Tubbesing
Assistant Examiner—Gilberto Barrón, Jr.
Attorney, Agent, or Firm—Karl F. Milde, Jr.

[57] ABSTRACT

A "passive interrogator label system" (PILS) comprises an interrogator for transmitting an interrogation signal, one or more "labels" or passive transponders which produce a reply signal containing coded information in response to the interrogation signal, and a receiver and decoder for receiving the reply signal and decoding the information contained in it. The frequency of the interrogation signal assumes a plurality of frequency values within a prescribed frequency range. The decoder includes a mixer (four quadrant multiplier) for mixing together the interrogation and reply signals (or signals derived therefrom) to produce a mixed signal containing frequencies which are the sum and difference of the frequencies of the interrogation and reply signals. A signal processor, responsive to this mixed signal, detects the amplitude and phase of at least some of the frequencies contained in the mixed signal and thereby determines the informational code associated with the transponder. Non-linearity in the transmitted frequency values is compensated by a circuit which produces a sampling signal when the frequency has changed by a prescribed amount Δf. This sampling signal triggers an analog-to-digital converter which converts the mixed signal (or a signal derived therefrom) into a digital value upon receipt of each sampling signal.

14 Claims, 12 Drawing Figures

APPARATUS FOR COMPENSATING NON-LINEARITIES IN FREQUENCY-MODULATED SIGNAL

CROSS REFERENCE TO RELATED APPLICATIONS

The present application is related in subject matter to the following commonly owned applications for patent: Application Ser. No. 509,523, filed June 30, 1983, for "System for Interrogating A Passive Transponder Carrying Amplitude and/or Phase Encoded Information" of P. Nysen, H. Skeie and D. Armstrong; Application Ser. No. 509,521, filed June 30, 1983, for "Surface Acoustic Wave Passive Transponder Having Optimally-Sized Transducers" of H. Skeie; Application Ser. No. 509,525, filed June 30, 1983, for "Surface Acoustic Wave Transponder Having Parallel Acoustic Wave Paths" of H. Skeie; Application Ser. No. 509,524, filed June 30, 1983, for "Surface Acoustic Wave Passive Transponder Having Non-Reflective Transducers and Pads" of H. Skeie; Application Ser. No. 509,526, filed June 30, 1983, for "Surface Acoustic Wave Passive Transponder Having Amplitude and Phase Modifying Surface Pads" of H. Skeie; Application Ser. No. 509,527, filed June 30, 1983, for "Surface Acoustic Wave Passive Transponder Having Acoustic Wave Reflectors" of H. Skeie and P. Nysen.

BACKGROUND OF THE INVENTION

The present invention relates to a system having a signal source for generating a signal having prescribed, time varying frequency and a signal utilization device, responsive to the aforementioned signal, which carries out a useful process in dependence upon the frequency of the signal.

As an example of such a system, the signal source may comprise a voltage controlled oscillator which is responsive to a time-varying input signal $S_o(t)$ to generate an output signal having the prescribed, time varying frequency $f(t)$ that is substantially directly proportional upon the input signal. The signal utilization means may be a laser scanner which employs an acoustic optic modulator to deflect the laser beam by an angle which is proportional to the frequency of an applied signal. As another example, the signal utilization device may comprise an interrogator-transponder system that transmits an interrogation signal having a frequency which is ramped substantially linearly upward and/or downward within a prescribed frequency range.

In systems of the type described above which are responsive to a monotonically increasing or decreasing frequency, non-linearities in this frequency with respect to time, or non-linearities in this frequency with respect to another signal or voltage introduces errors in the signal utilization device. Prior attempts to compensate for non-linearities were primarily concerned with methods and means for linearizing the time or voltage versus frequency function itself. Thus, for example, feedback loops have been provided between the output of the signal source and its control input for correcting non-linearities in the output.

SUMMARY OF THE INVENTION

It is an object of the present invention to provide apparatus for compensating for non-linearities in the time behavior of the frequency f(t) of a first signal.

This object, as well as other objects will become apparent from the discussion that follows, are achieved, according to the present invention, by providing a delay element, coupled to receive the first signal, for producing a second signal which is a delayed version of the first signal with a prescribed signal delay ($T_1$); a signal mixer for mixing together the first and the second signals to produce a third signal; and a device, responsive to the third signal, for producing a sampling signal having a frequency which is dependent upon the frequency of the third signal. For reasons which will be explained in detail below, this sampling signal defines the instants of time at which the frequency of the first signal has changed by a prescribed amount $\Delta f$ (where $\Delta f = 1/T_1$ or a whole fraction or an integer multiple thereof).

Finally, according to the invention, this sampling signal is supplied to the signal utilization device which is responsive to changes in the frequency of the first signal by the prescribed amount as determined by the sampling signal.

In one preferred embodiment of the invention, the delay element provides a constant signal delay $T_1$. In another embodiment the delay $T_1$ is a known function of the frequency f(t) of the first signal. In the latter case, where the delay $T_1$ is a function of frequency, the prescribed amount of frequency change $\Delta f$ between instants of time defined by the sampling signal will also be frequency dependent.

For a full understanding of the present invention, reference should now be made to the following detailed description of the preferred embodiments of the invention and to the accompanying drawings.

DESCRIPTION OF THE PREFERRED EMBODIMENTS

Figure 1:
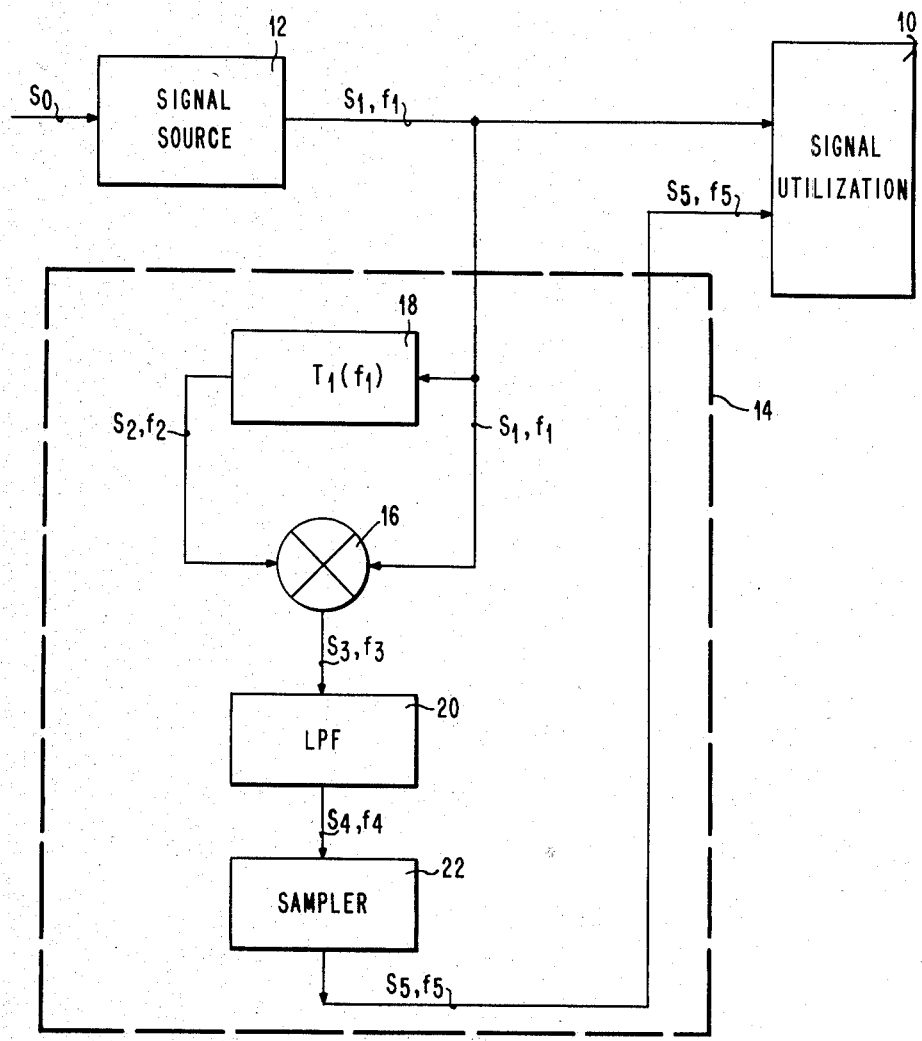
FIG. 1 is a block diagram of the apparatus according to the present invention for compensating non-linearities in a frequency modulated signal.

The present invention will now be described with reference to FIGS. 1-12 of the drawings. Identical elements in the various figures are designated by the same reference numerals.

FIG. 1 shows the general system according to the present invention for providing a signal $S_1$ having a monotonically time-varying frequency $f_1$ as well as a sampling signal $S_5$, having a particular sampling frequency $f_5$, to a signal utilization device 10. The signal utilization device may be any device which responds to the signal $S_1$ and takes some action or operates in dependence upon the frequency $f_1$. Two specific examples of this signal utilization device will be described below in connection with FIGS. 5-12.

Suffice it to say, for the purpose of this general description, that the signal utilization device 10 is responsive to the time-varying frequency $f_1$ so that deviations between the actual value and the desired value of this frequency result in unacceptable errors in the operation of the signal utilization device.

The signal $S_1$ may be produced by any suitable source 12. For example, this signal source may be a voltage-controlled oscillator (VCO) which produces an output signal $S_1$ of frequency $f_1$ which is linearly related to an input voltage $S_0$. That is:

$$f_1(t) = KS_o(t) + k,$$

Where K and k are constants.

As an example, the input voltage $S_0$ may be a sawtooth signal which repeatedly ramps linearly upward from a minimum value to a maximum value. Such an input signal would result in an output signal $S_1$ having a frequency $f_1$ which ramps upward substantially linearly from an initial value $f_{min}$ to a maximum value $f_{max}$. In this configuration, these are two sources of deviation of the frequency $f_1$ from an absolutely linear upward ramp ($df_1/dt = $ constant):

1. The input voltage $S_0$ is not exactly linear with respect to time ($ds_o/dt = $ constant);
2. The frequency $f_1$ is not exactly linearly related to the input signal $S_0$ ($f_1 = K\ S_o + k$). in many cases, this non-linearity of the signal $f_1$ does not adversely effect the operation of the signal utilization device 10. However, for certain applications this non-linearity is unacceptable and it is necessary to correct or compensate for deviations from the desired value of $f_1$.

Clearly, it is possible to take certain corrective measures such as improving the quality of the source of the voltage $S_0$ (e.g. a ramp generator) to improve its linearity and similarly, to improve the quality of the signal source 12 to improve the linearity of the relationship between the frequency $f_1$ and the signal $S_0$.

Furthermore, it is known to provide a phase lock loop between the output and the input of the signal source 12 to maintain the linearity of the signal source. This solution has the disadvantage of increasing the complexity of the system while failing to compensate for non-linearities in the original voltage signal $S_o$.

According to the invention, the system is provided with separate apparatus 14 which produces and supplies the signal utilization device 10 with a sampling signal $S_5$ that defines instants of time in which the frequency $f_1$ of the first signal $S_1$ has changed by a prescribed amount. According to the invention this sampling signal $S_5$ is generated in the following manner:

The original signal $S_1$, of frequency $f_1$ is supplied to a four-quadrant mixer 16 both directly and indirectly via a delay element 18 having a delay period $T_1$. The output signal $S_2$ of the delay element 18 having a frequency $f_2$ is thus also applied to the mixer 16. The delay period $T_1$ may be a constant delay, or it may be dependent on the applied frequency $f_1$, as shown.

It will be understood that, while the signal $S_1$ is applied directly to the mixer 16 and to the delay element 18 in this particular embodiment, it is also possible to pass the signal $S_1$ through a frequency multiplier, divider or the like to derive a further signal which is applied to the mixer 16 and the delay element 18. The essential feature, according to the invention, is that the frequency of this signal applied to the mixer and the delay element be either the same or derived from, related to and synchronized with the frequency $f_1$.

The mixer 16 produces an output signal $S_3$ having frequencies $f_3$ which equal the sum and the difference of the frequencies $f_1$ and $f_2$. This signal $S_3$ is applied to a filter, such a low pass filter 20, which produces a signal $S_4$ containing only the difference frequency contained in the signal $S_3$. This signal $S_4$ is then applied to a sampling device 22 which produces the sampling signal $S_5$ with the sampling frequency $f_5$.

Figure 2:
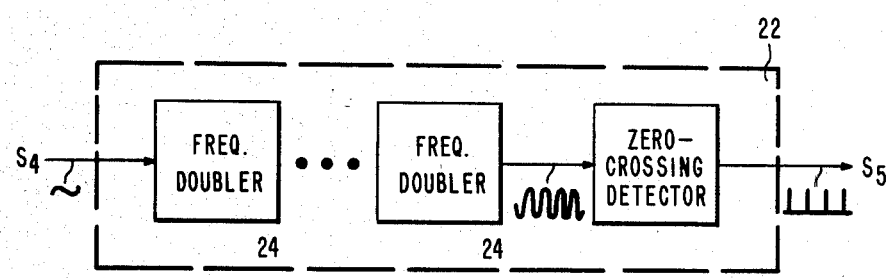
FIG. 2 is a block diagram of the sub-elements contained in the sampling element in the apparatus of FIG. 1.

The sampling device 22 may take the form illustrated in FIG. 2. This device comprises one or more frequency doublers 24 so that the sampling frequency $f_5$ will be a multiple of the frequency $f_4$. The output of the frequency multipliers (e.g. doublers) 24 is passed to a zero-crossing detector which produces a sampling pulse at every positive or negative-going zero crossing.

Figure 3:
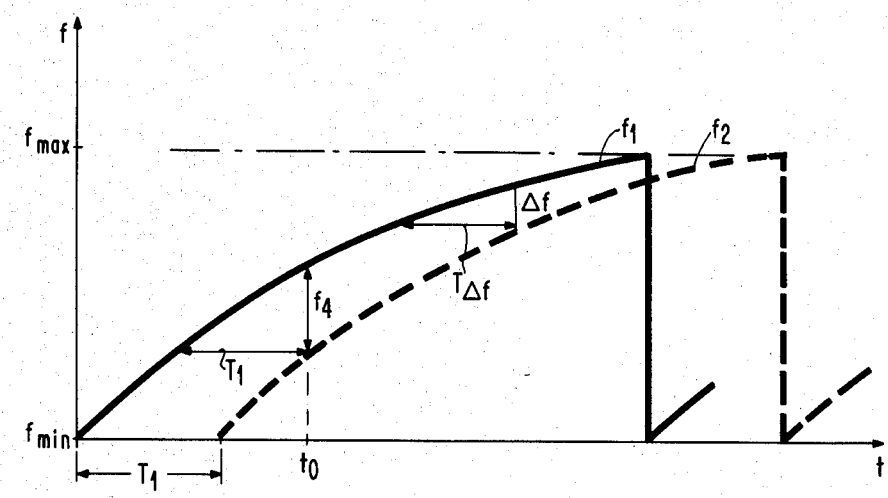
FIG. 3 and FIG. 4 are frequency versus time diagrams which illustrate the operation of the apparatus in FIG. 1.
Figure 4:
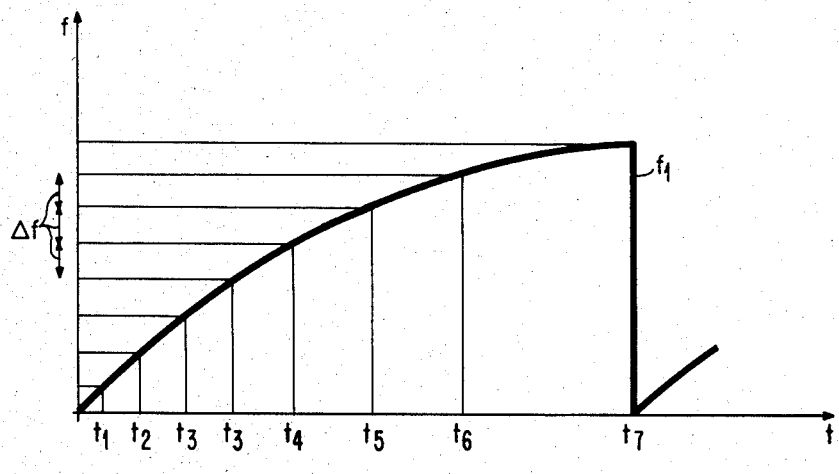

The operation of the apparatus 14 shown in FIG. 1 will now be described with reference to the diagrams of FIGS. 3 and 4. These diagrams show the frequency $f_1$ as a function of time. As may be seen, the frequency $f_1$ ramps upward from a minimum frequency $f_{min}$ to a maximum frequency $f_{max}$ and then drops abruptly again to the minimum frequency $f_{min}$. It is desired that the frequency $f_1$ be a linear function of time between the two limits; that is, $df_1/dt = $ constant. However, it would be extremely expensive to provide a signal source with an output frequency which is exactly linear. FIGS. 3 and 4 show the non-linearity in the frequency $f_1$ with considerable exaggeration to faciliate understanding.

FIG. 3 shows the frequency $f_2$ of the signal $S_2$ in dashed lines. This frequency is identical to the frequency $f_1$; however, it is delayed by the period $T_1$. Examining the diagram, it may be seen that the difference in frequency between $f_1$ and $f_2$ at any given instant of time (e.g., $t_0$) is $f_4$; that is, the frequency of the signal $S_4$ appearing at the output of the low pass filter 20. Since the signal $S_2$ is merely a delayed version of the signal $S_1$, the slope of the curve $f_1$ at time $t_0$ is approximately:

$$df_1/dt = f_4/T_1$$

Now, by definition, the slope of the frequency curve $f_1$ is $$df_1/dt = \Delta f/T_{\Delta f},$$

where $\Delta f$ is in the change in the frequency $f_1$ during the period $T_{\Delta f}$.

Now, if the period $T_{\Delta f}$ is set equal to $T_f/4$ (the period of the signal $S_4$ and frequency $f_4$) then:

$$f_4/T_1 = \Delta f/T_f$$

Since $$f_4 = 1/T_{f4},$$

$$\Delta f = 1/T_1 = \text{constant}.$$

Therefore, for every cycle of the signal $S_4$ (frequency $f_4$ and period $T_{f4}$) the frequency $f_1$ changes by a fixed amount $\Delta f$. Thus, the sampling signal which has a frequency $f_5 = Mf_4$, where M is an integer, will define those instants in which the frequency $f_1$ of the signal $S_1$ has changed by prescribed amount.

FIG. 4 indicates, an exaggerated form, how the sampling pulses appear at successive instants of time $t_1, t_2 \ldots t_7$ which specify equal changes $\Delta f$ in the frequency $f_1$. The magnitude of the change in frequency $\Delta f$ is determined by $T_1$ and the integer M.

Figure 5:
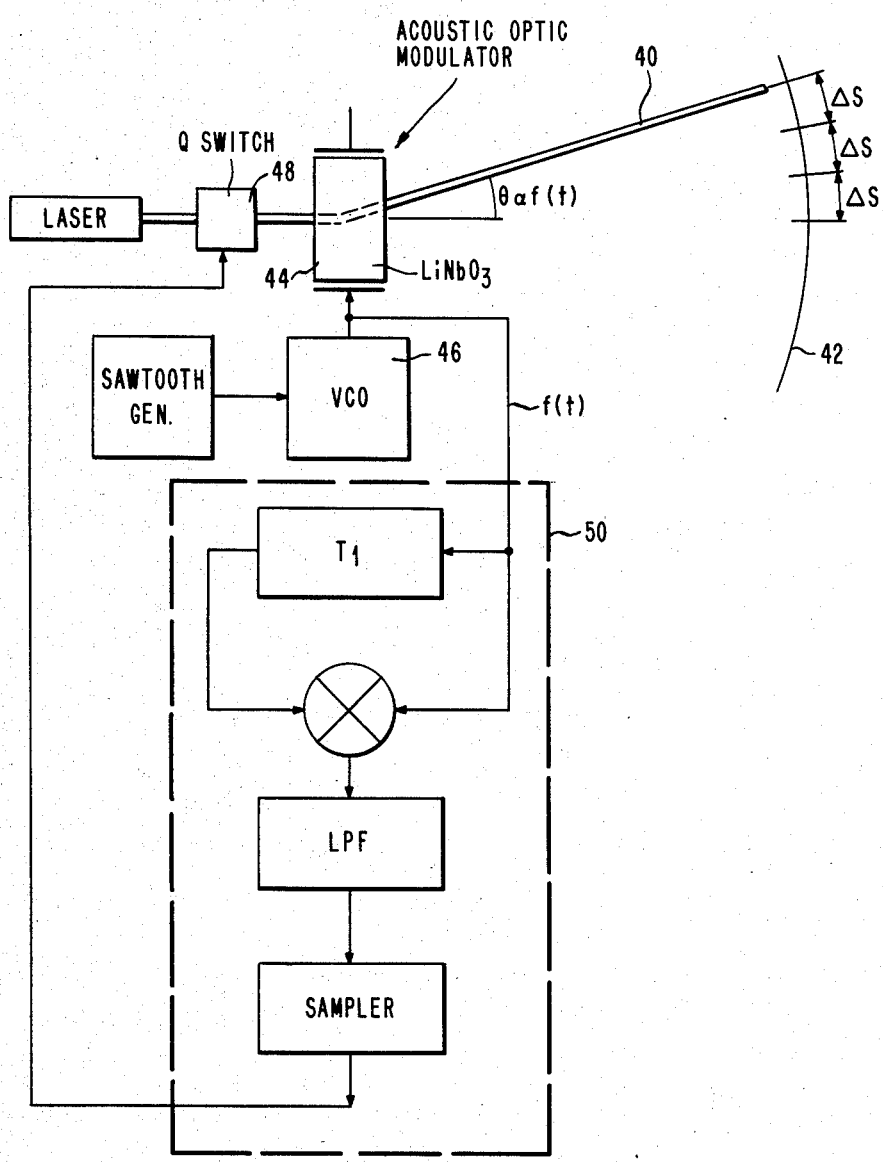
FIG. 5 is a block diagram illustrating the use of the present invention with a laser beam scanner.

FIG. 5 illustrates a system for scanning a laser beam 40 across a screen or other surface 42. The scanning is accomplished by an acousto optic modulator 44.

A voltage controlled oscillator 46 supplies a signal of frequency f to the plates of the modulator. The angle $\theta$ of deflection of the beam 40 is directly proportional to this frequency.

It will understood that a linear sweep of the frequency f will result in a constant scanning speed across the surface 42. However, non-linearities, which inevitably result, will distort the image produced by the scanner.

According to the invention, a sampling signal is supplied to a Q-switch 48, which modulates the beam, to define increments in time during which the beam is scanned by equal spacial increments in space $\Delta S$ along the screen 42. These increments in space may be made as small as desired by proper choice of the delay period $T_1$ and the frequency multiplier M in the apparatus 50 which generates the sampling signal.

FIGS. 6–12 illustrate the use of the present invention in an interrogator-transponder system employing a surface accoustic wave transponder. A system of this general type is disclosed in the U.S. Pat. No. 3,706,094 to Cole and Vaughn. This particular system is described in detail in the commonly-owned patent application Ser. No. 509,523, filed June 30, 1983, for "System for Interrogating a Passive Transponder Carrying Amplitude and/or Phase Encoded Information" of P. Nysen, H. Skeie and D. Armstrong.

Figure 6:
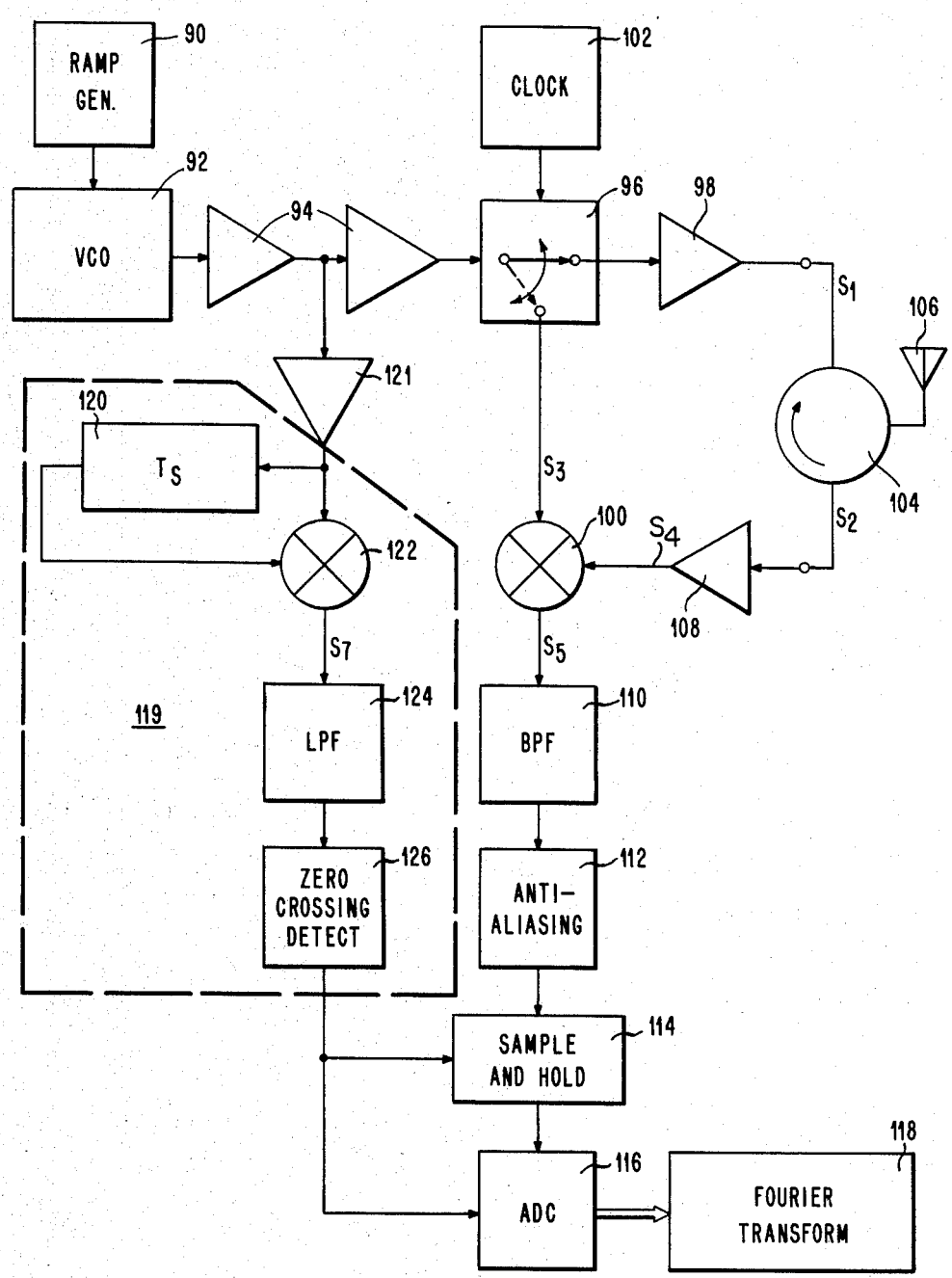
FIG. 6 is a block diagram illustrating the use of the present invention with an interrogator-transponder system.

The transmitter/receiver and decoder system shown in FIG. 6 comprises a ramp generator 90 which supplies a sawtooth waveform to a voltage controlled oscillator (VCO) 92. The VCO produces an output signal of frequency f which repeatedly ramps linearly upward from a frequency of 905 MHz to a frequency of 925 MHz. This signal is amplified by the RF amplifiers 94 and supplied to a transmit/receive switch 96. The switch 96 directs the signal either to a transmitter power amplifier 98 or to a decoding mixer 100. The switch 96 is controlled by a 100 KHz square wave signal produced by a clock 102. The output signal $S_1$ from the amplifier 98 is supplied to an external circulator or transmit/receive (TR) switch 104 and is transmitted as electromagnetic radiation by an antenna 106.

Figure 7:
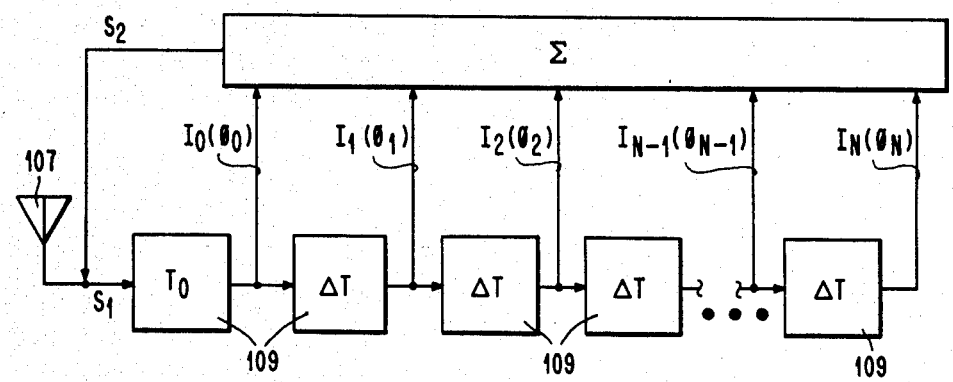
FIG. 7 is a block diagram of a passive transponder which may be used with the system of FIG. 6.

A block diagram of the transponder associated with the system of FIG. 6 is shown in FIG. 7. The transponder receives the signal $S_1$ at an antenna 107 and passes it to a series of delay elements 109 having the indicated delay periods $T_0$ and $\Delta T$. After passing each successive delay, a portion of the signal $I_0, I_1, I_2 \ldots I_N$ is tapped off and supplied to a summing element 111. The resulting signal $S_2$, which is the sum of the intermediate signals $I_0 \ldots I_N$, is fed back to the antenna 107 for transmission to the antenna 106 in the system of FIG. 6.

The transponder reply signal $S_2$ is received by the antenna 106 and passed through the circulator or TR switch 104 to a receiver amplifier 108. The output $S_4$ of this amplifier 108 is heterodyned in the mixer with the signal $S_3$ intermittently presented by the switch 96.

The output $S_5$ of the mixer 100 contains the sum and the difference frequencies of the signals $S_3$ and $S_4$. This output is supplied to a band pass filter 110 with a pass band between 1 and 3 KHz. The output of this filter is passed through an anti-aliasing filter 112 to a sample-and-hold circuit 114.

The sample-and-hold device supplies each sample to an analog-to-digital converter 116. The A/D converter, in turn, presents the digital value of this sample to a processor 118 that analyzes the frequencies contained in the signal by means of a Fourier transform. The sample-and-hold device 114 and the A/D converter 116 are strobed by a sampling signal produced by the apparatus 119 according to the invention. As explained above, this sampling signal serves to compensate for the non-linearity, with respect to time, in the monotonically increasing frequency f of the VCO output signal.

The apparatus 119 receives the signal produced by the VCO 92 via an isolating amplifier 121. The signal is passed through a delay element 120 with a constant signal delay $T_s$. Both the delayed and the undelayed signals are supplied to a mixer 122 which produces a signal $S_7$ containing both sum and difference frequencies. The signal $S_7$ is supplied to a low pass filter 124 which passes only the portion of this signal containing the difference frequencies. The output of the low pass filter is supplied to a zero-crossing detector 126 which produces a pulse at each positive (or negative) going zero crossing. These pulses are used to strobe the sample-and-hold device 114 and the A/D converter 116.

Figure 10:
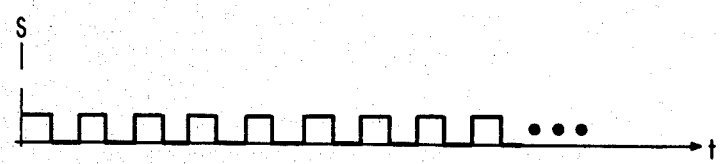
FIG. 10 and FIG. 11 are timing diagrams of voltage and frequency, respectively, illustrating the operation of the system in FIG. 6.
Figure 11:
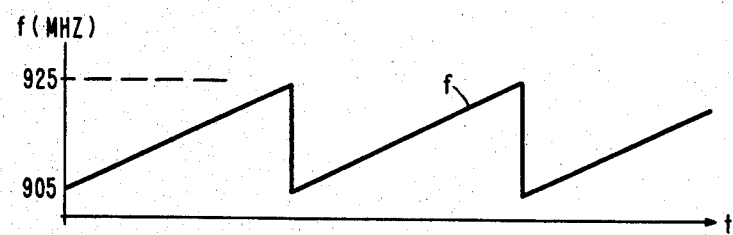
Figure 12:
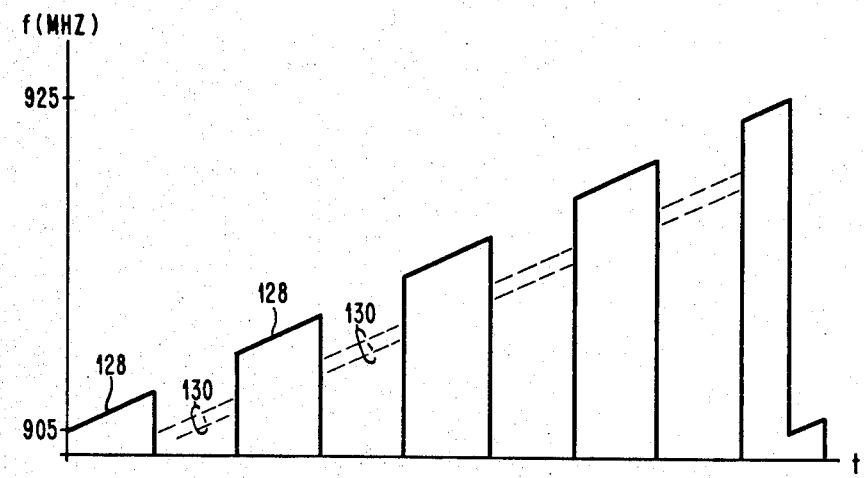
FIG. 12 is a frequency versus time diagram further illustrating the operation of the system of FIG. 6.

FIGS. 10–12 illustrate the operation of the circuit of FIG. 6. FIG. 10 shows the 100 KHz output of the clock 102; FIG. 11 shows the frequency sweep of the signal produced by the VCO 92. FIG. 12 shows, in solid lines 128, the frequency of the transmitted signal $S_1$ and, in dashed lines 130, the frequency of the signal $S_2$ as received from the transponder. As may be seen, the signal 130 is received during the interval between transmissions of the signal 128. These intervals are chosen to equal, approximately, the round trip delay time between the transmission of a signal to the transponder and the receipt of the transponder reply. As indicated by the multiple dashed lines, the transponder reply will contain a number of frequencies at any given instant of time as a result of the combined (i.e., summed) intermediate signals having different delay times ($T_0, T_0+\Delta T, T_0+2\Delta T, \ldots T_0+N\Delta T$).

Figure 8:
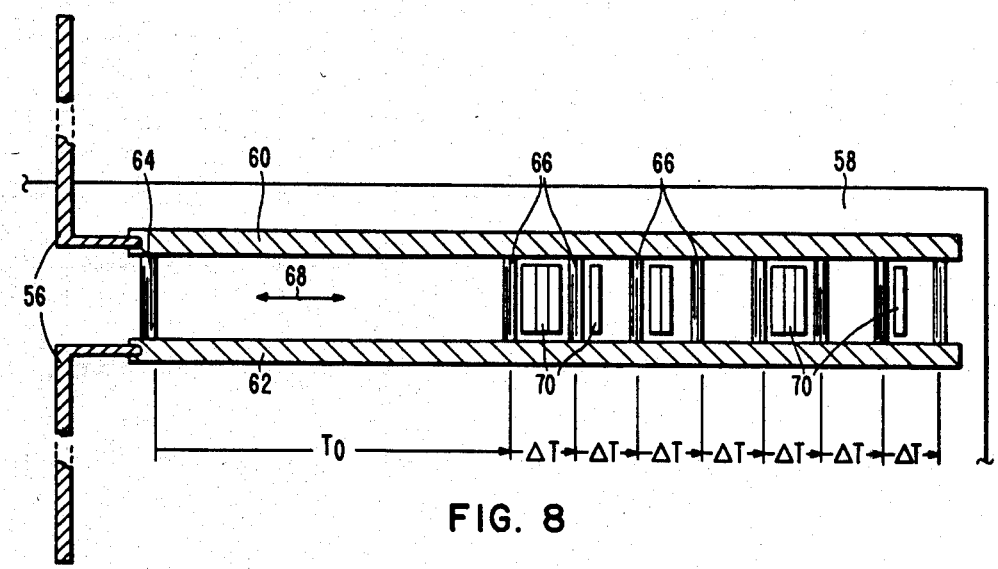
FIG. 8 is a representational diagram showing one preferred implementation of the transponder illustrated in FIG. 7.
Figure 9:
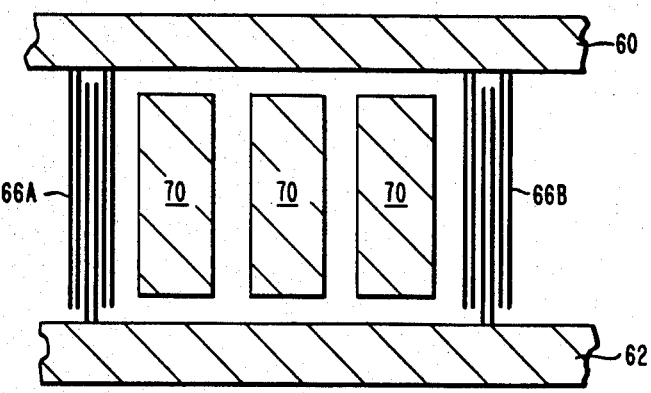
FIG. 9 is a representational diagram showing a portion of the device in FIG. 8 in detail.

FIGS. 8 and 9 illustrate an embodiment of a transponder which implements the block diagram of FIG. 7. This transponder operates to convert the received signal $S_1$ into an acoustic wave and then to reconvert the acoustic energy back into an electrical signal $S_2$ for transmission via a dipole antenna 56. More particularly, the signal transforming element of the transponder includes a substrate 58 of piezoelectric material such as a lithium niobate (LiNbO$_3$) crystal. On the surface of this substrate is deposited a layer of metal, such as aluminum, forming a pattern such as that illustrated in FIG. 9. For example, this pattern may consist of two bus bars 60 and 62 connected to the dipole antenna 56, a "launch" transducer 64 and a plurality of "tap" transducers 66. The bars 60 and 62 thus define a path of travel 68 for an acoustic wave which is generated by the launch transducers and propogates substantially linearly, reaching the tap transducers each in turn. The tap transducers convert the acoustic wave back into electrical energy which is collected and therefore summed by the bus bars 60 and 62. This electrical energy then activates the dipole antenna 56 and is converted into electromagnetic radiation for transmission as the signal $S_2$.

The tap transducers 56 are provided at equally spaced intervals along the acoustic wave path 68 as shown in FIG. 8, and an informational code associated with the transponder is imparted by providing a selected number of "delay pads" 70 between the tap transducers. These delay pads, which are shown in detail in FIG. 9, are preferably made of the same material as, and deposited with, the bus bars 60, 62 and the transducers 64, 66. Each delay pad has a width sufficient to delay the propagation of the acoustic wave from one tap transducer 66 to the next by one quarter cycle or 90° with respect to an undelayed wave at the frequency of operation (circa 915 MHz). By providing locations for three delay pads between successive tap transducers, the phase $\phi$ of the acoustic wave received by a tap transducer 66B may be controlled to provide four phase possibilities:

1. No pad between tap transducers 66A and 66B = −90°;
2. One pad between tap transducers 66A and 66B = 0°;
3. Two pads between tap transducers 66A and 66B = 90°; and
4. Three pads between tap transducers 66A and 66B = 180°.

Referring to FIG. 7 the phase information $\phi_0$ (the phase of the signal picked up by the first tap transducer in line), and $\phi_1, \phi_2 \ldots \phi_N$ (the phases of the signals picked up by the successive tap transducers) is supplied to the combiner (summer) which in the embodiment of FIG. 8 comprises the bus bars 60 and 62. This phase information, which is transmitted as the signal $S_2$ by the antenna 56, contains the informational code of the transponder.

There has thus been shown and described a novel apparatus for compensating non-linearities in a frequency-modulated signal which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other other uses and applications which do not depart from the spirit and scope of the invention are deemed to be covered by the invention which is limited only by the claims which follow.

What is claimed is:

1. In a system for interrogating a transponder carrying encoded information, said system comprising:
   (1) means for transmitting a first signal having a time varying first frequency f(t), said first frequency successively assuming a plurality of frequency values within a prescribed frequency range and having, within said range, a monotonically varying average time derivative (df/dt);
   (2) remote transponder means for receiving said first signal and for transmitting a second signal in reply thereto, said transponder means including signal transforming means, coupled to receive said first signal as an input, for producing said second signal as an output, said signal transforming means including:
      (i) a plurality of signal conditioning means coupled to receive said first signal, each signal conditioning means providing an intermediate signal having a known delay and a known amplitude modification to said first signal; and
      (ii) signal combining means coupled to all of said signal conditioning means, for combining said intermediate signals to produce said second signal, said signal conditioning means and said signal combining means imparting a known informational code to said second signal associated with said transponder means;
   (3) means for receiving said second signal from said transponder means;
   (4) means, coupled to said transmitting means, for producing a third signal derived from said first signal;
   (5) means, coupled to said receiving means, for producing a fourth signal derived from said second signal;
   (6) first signal mixing means for mixing together said third signal and said fourth signal, thereby to produce a fifth signal;
   (7) analog-to-digital converter means, coupled to said first mixing means, for producing digital samples of said fifth signal in response to a sampling signal; and
   (8) digital signal processing means, responsive to said digital samples, for analyzing at least some of the frequencies contained in said fifth signal, thereby to determine said informational code associated with said transponder means;
   the improvement comprising apparatus for compensating for non-linearities in said average time derivative (df/dt) including:
      (a) delay means, coupled to receive as an input signal said first signal, for producing a delayed signal which is a delayed version of said input signal with a prescribed time delay ($T_1$);
      (b) second signal mixing means for mixing together said first signal and said delayed signal thereby to produce a sixth signal; and
      (c) means responsive to said sixth signal for producing said sampling signal having a frequency which is dependent upon the frequency of said sixth signal, the sampling times of said sampling signal defining those instants at which the first signal has changed in frequency by a prescribed amount $\Delta f$ ($\Delta f = 1/T_1$ or a whole fraction or an integer multiple thereof), wherein said analog-to-digital converter means is responsive to said sampling signal for producing a digital sample when said frequency f(t) has changed by said prescribed amount $\Delta f$.

2. The improvement defined in claim 1, wherein said delay means provides a constant signal delay ($T_1$).

3. The improvement defined in claim 1, wherein said delay means provides a signal delay ($T_1$) which is a function of the frequency f(t) of said first signal.

4. The improvement defined in claim 1, wherein said first and second mixing means include (1) heterodyning means for producing an output signal with frequencies equal to the sum and difference of the frequencies of the received signals, respectively; and (2) a frequency filter, coupled to receive said output signal, for passing only the portion of said output signal containing the difference frequencies.

5. The improvement defined in claim 4, wherein said frequency filter is low-pass filter.

6. The improvement defined in claim 1, wherein said signal producing means includes a frequency multiplier.

7. The improvement defined in claim 6, wherein said frequency multiplier includes a frequency doubler.

8. The improvement defined in claim 7, wherein said frequency multiplier includes a plurality of frequency doublers connected in series.

9. The improvement defined in claim 1, wherein said signal producing means includes a frequency divider.

10. The improvement defined in claim 1, wherein said signal producing means includes zero-crossing detector means for producing a digital sampling signal.

11. The improvement defined in claim 1, wherein said signal transforming means includes a substrate having a substrate surface defining a plurality of paths of travel for acoustic waves, each path of travel having a different length from its beginning to its end; and electric circuit means for propagating surface acoustic waves along said paths of travel, from said beginning of each path to said end thereof.

12. The improvement defined in claim 11, wherein said circuit means includes at least one launch transducer arranged on said surface for converting said first signal into surface acoustic waves which propagate along said paths of travel; a plurality of tap transducers arranged on said surface at spaced intervals along said paths of travel for converting said acoustic waves into output signals; and an electric circuit, coupled to said tap transducers, for combining said output signals to form said second signal.

13. The improvement defined in claim 11, further comprising a plurality of acoustic wave delay pads disposed on the surface of said substrate along said paths of travel to control the acoustic wave propagation time along said paths of travel.

14. The improvement defined in claim 13, wherein all of said delay pads have the same width in the direction of travel of the acoustic waves along said paths, whereby the presence or absence of a pad changes the propagation time of the acoustic waves by a prescribed amount.

* * * * *